United States Patent
Murad et al.

(10) Patent No.: US 7,333,023 B2
(45) Date of Patent: Feb. 19, 2008

(54) OCCUPANT CLASSIFICATION SYSTEM AND METHOD

(75) Inventors: Mohannad Murad, Troy, MI (US); James G. Stanley, Novi, MI (US)

(73) Assignee: TK Holdings Inc., Auburn Hills, MI (US)

( * ) Notice: Subject to any disclaimer, the term of this patent is extended or adjusted under 35 U.S.C. 154(b) by 239 days.

(21) Appl. No.: 11/148,989

(22) Filed: Jun. 10, 2005

(65) Prior Publication Data

US 2005/0275555 A1 Dec. 15, 2005

Related U.S. Application Data

(60) Provisional application No. 60/578,304, filed on Jun. 10, 2004.

(51) Int. Cl.
*G08B 21/00* (2006.01)

(52) U.S. Cl. .................. 340/667; 340/665; 340/666; 180/273; 701/45

(58) Field of Classification Search .............. 340/665, 340/666, 667; 180/273; 701/45
See application file for complete search history.

(56) References Cited

U.S. PATENT DOCUMENTS

| 6,161,439 | A | 12/2000 | Stanley |
| 6,246,936 | B1 | 6/2001 | Murphy et al. |
| 6,259,167 | B1 | 7/2001 | Norton |
| 6,260,879 | B1 | 7/2001 | Stanley |
| 6,356,200 | B1 * | 3/2002 | Hamada et al. ............. 340/667 |
| 6,438,477 | B1 | 8/2002 | Patterson et al. |
| 6,542,802 | B2 | 4/2003 | Gray et al. |
| 6,725,165 | B1 * | 4/2004 | Knox et al. ................... 702/42 |
| 6,764,094 | B1 | 7/2004 | Curtis |
| 6,940,026 | B2 * | 9/2005 | Rundell et al. ............. 177/144 |
| 7,082,360 | B2 * | 7/2006 | Oestreicher et al. .......... 701/45 |
| 2002/0043789 | A1 | 4/2002 | Lichtinger et al. |
| 2003/0090376 | A1 * | 5/2003 | Thompson et al. ......... 340/667 |
| 2004/0016577 | A1 | 1/2004 | Lichtinger et al. |
| 2004/0080425 | A1 * | 4/2004 | Sullivan et al. ............. 340/667 |
| 2006/0124364 | A1 * | 6/2006 | Loewen et al. ................ 177/45 |

FOREIGN PATENT DOCUMENTS

WO  WO 02/25229 A1  3/2002

* cited by examiner

*Primary Examiner*—Jeffery Hofsass
*Assistant Examiner*—Samuel J. Walk
(74) *Attorney, Agent, or Firm*—Foley & Lardner LLP

(57) ABSTRACT

A system for classifying an occupant located on a vehicle seat comprising a controller configured to receive signals from a plurality of sensors for detecting the vertical forces on the seat. The controller is configured to determine whether the detected vertical forces are indicative of the weight of the seat and the weight of the occupant located on the vehicle seat.

16 Claims, 5 Drawing Sheets

US 7,333,023 B2

OCCUPANT CLASSIFICATION SYSTEM AND METHOD

CROSS REFERENCE TO RELATED APPLICATIONS

This application claims priority to and the benefit of U.S. Provisional Patent Application No. 60/578,304 filed on Jun. 10, 2004 (incorporated by reference herein in its entirety).

BACKGROUND

The present invention is directed to an occupant classification system and a method for classifying an occupant in a vehicle seat. In particular, at least one embodiment of the invention is directed to the classification of occupants located in a motor vehicle seat. In particular, the system and method is directed to classifying the type of occupant located in the vehicle seat and controlling the deployment of an occupant restraint system (e.g., an airbag or seat belt) accordingly.

The following U.S. patents (all incorporated by reference herein) disclose various acceleration and variation based occupant sensing and classification systems: U.S. Pat. Nos. 6,438,477; 6,246,936; 6,542,802; 6,161,439; and 6,259,167.

Current occupant classification systems (OCS) do not include the capability to detect and flag interfering objects. Such objects usually affect the output of the occupant classification module and cause an improper occupant classification to be made.

Due to interfering objects, conventional occupant classification systems may incorrectly classify the type of occupant or object located in a vehicle seat. As a result, the performance of a corresponding occupant restraint system may be adversely affected. Therefore, a system and method is needed to determine whether interference is influencing the occupant detection system.

SUMMARY

According to an embodiment of the present invention, a system for detecting and classifying an occupant located in a vehicle seat is provided. The system may include a plurality of force sensors located beneath a vehicle seat and a controller. Each of the force sensors provides a signal during normal operation corresponding to the detected vertical force on the vehicle seat to the controller. The controller is configured to identify instances when the vertical forces on the force sensors are not indicative of the weight of the seat and the weight of the occupant located on the vehicle seat.

According to an alternative embodiment, each of the plurality of force sensors is positioned between the vehicle seat and a seat rail. Furthermore, the system may include at least three force sensors. Each force sensor may provide a measurement indicative of the force on that sensor to the controller.

According to yet another embodiment of the invention, a system for classifying an object located on a vehicle seat includes a controller configured to receive a signal from a plurality of sensors and determine whether the vertical forces on the vehicle seat are indicative of the weight of the seat and the weight of the occupant located on the vehicle seat. The sensors may be configured to detect vehicle speed, vehicle seat position, seat belt tension, horizontal or vertical vehicle accelerations, and vertical force applied to the vehicle seat.

According to another alternative embodiment of the present invention, a method for classifying an object located in a vehicle seat is provided. The method preferably includes the steps of providing a plurality of force sensors, each force sensor providing a signal corresponding to a measured vertical force applied to the vehicle seat through that sensor; determining the total vertical force on the seat based on the signals from all of the plurality of force sensors; and determining whether the total force on the vehicle seat is less than a threshold value.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Embodiments of the present invention will be described below with reference to the accompanying drawings. It should be understood that the following description is intended to describe exemplary embodiments of the invention, and not to limit the invention.

Figure 1:
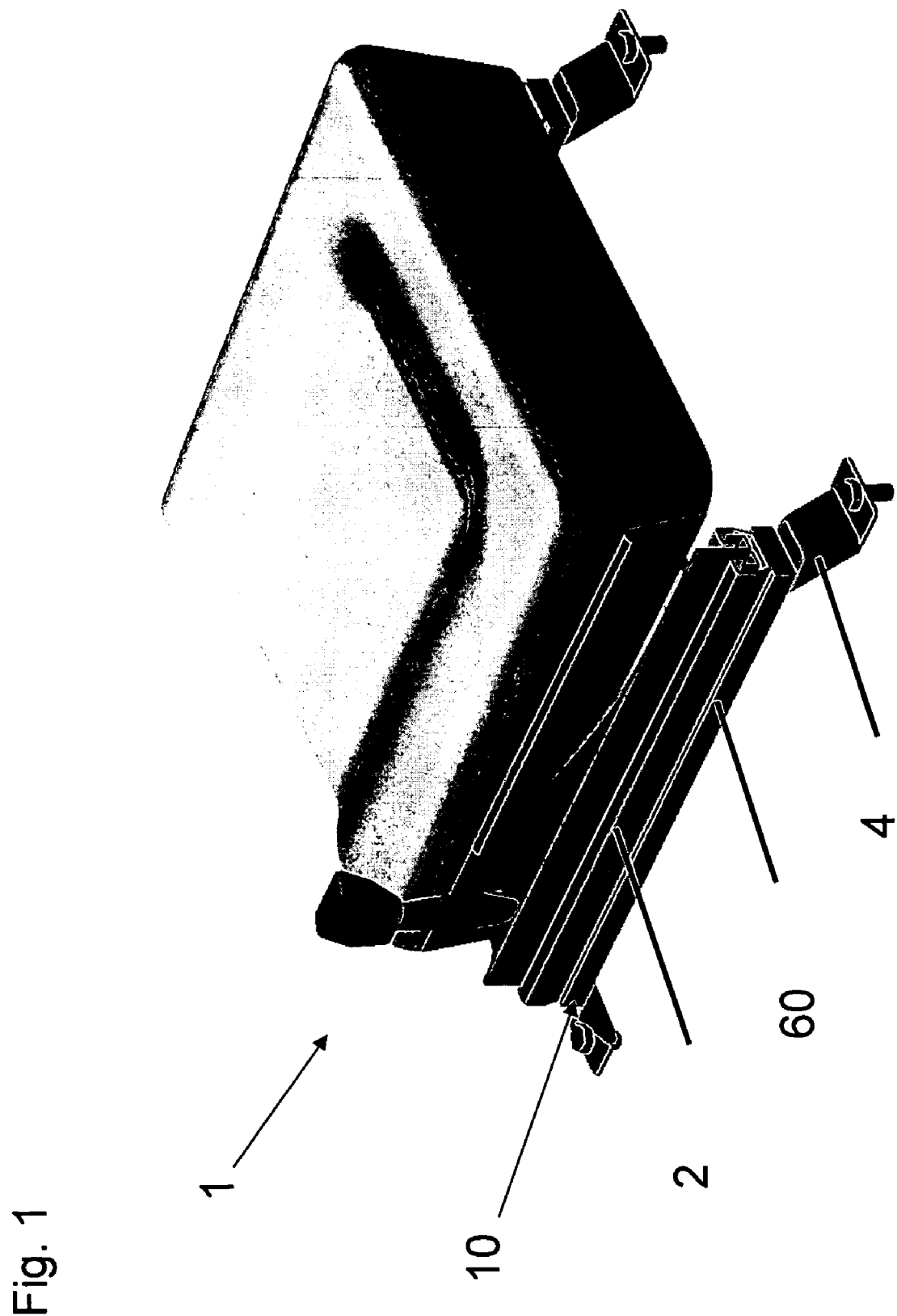
FIG. 1 is a perspective view of a vehicle seat according to one embodiment of the invention.

FIG. 1 shows a car seat 1 for a vehicle. The bottom portion of the car seat 1 includes two rails 10, 20 (rail 20 not shown) each having a seat track 2, a sensor 60 and a riser 4. Generally, the car seat 1 is bolted to the floor portion of a vehicle and the car seat 1 is partially elevated off the vehicle floor via the risers 4. The seat track 2 is generally used to reposition the car seat 1. The sensor 60 is a sensor used by the occupant classification system 100 (not shown) to detect the weight of an occupant sitting in the vehicle seat 1 by detecting the vertical force applied to the vehicle seat 1.

One object of the present invention is to provide a mechanism for detecting a condition that may interfere with classification of an occupant in a car seat 1. For example, an object (e.g., a ball, book or children's toy) may become stuck underneath the car seat 1 or entrapped within the car seat 1 system base frame thereby interfering with the force measurements. Further by way of example, an object may rest on the surface of the seat 1, such as a large mass sitting on the corner of the seat. In this case, the force sensors would sense the actual vertical force on the seat, but the total force would not be indicative of the occupant's weight. In another example, seat belt tension may provide an extra force to the sensors thereby causing the force not to be indicative of the occupant's weight. In each situation, the distribution of the vertical forces amongst the sensors would be unexpected. According to another embodiment of the present invention, once an interfering object or unusual force distribution has been detected, the occupant classification system 100 will recognize that the vertical force detected by the sensors 60 cannot be used to reliably calculate an occupant classification.

The controller 30 may be configured to transmit a faulty system signal if the distribution of the vertical force on the seat as determined from the signals provided by the sensors falls outside of a range of force distribution expected for the calculated occupant class. The faulty system signal may initiate an indicator. For example, the faulty system signal may cause the illumination of a light or similar indicator on the vehicle instrument panel or other location visible to an occupant of the vehicle. Alternatively, the faulty system signal may cause an audible indicator or alarm to sound.

Figure 2A:
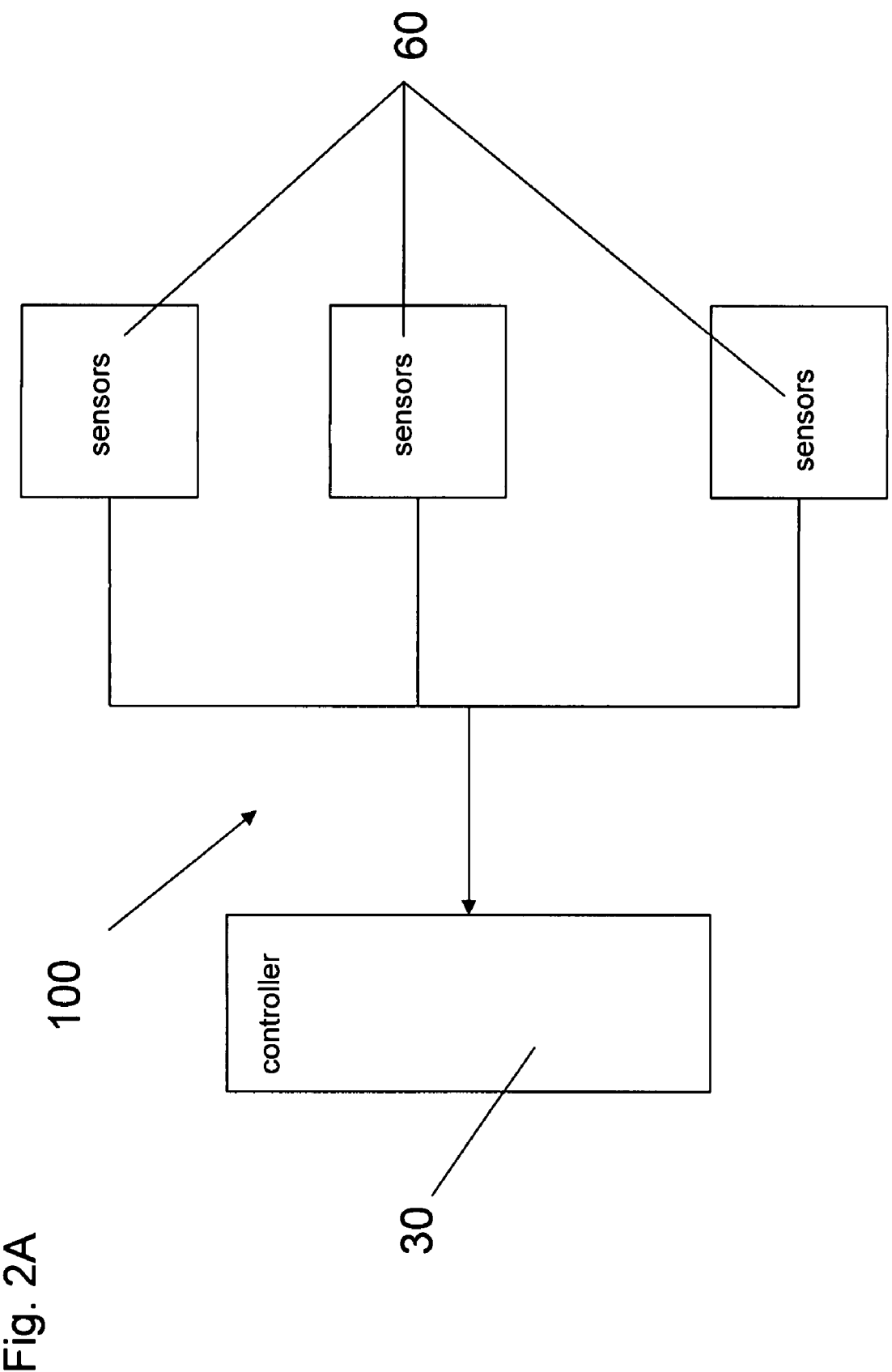
FIG. 2A is a block diagram of an occupation classification system.

FIG. 2A is a block diagram of an occupant classification system 100. As shown in FIG. 2A, a plurality of sensors is operably connected to a controller 30. The plurality of sensors may be used to detect vertical force, vehicle speed, vehicle seat 1 position, vehicle acceleration (horizontal or vertical) and seat belt tension. The plurality of sensors are mounted throughout a vehicle based on what conditions the sensors are designed to measure. For example, the sensors 60 for detecting the vertical force applied to the vehicle seat 1 are positioned underneath the vehicle seat 1 at a position indicated in FIG. 1. The sensors 60 may be any of a number of well-known sensors suitable for detecting the force on the seat. For example, the sensors 60 may be Hall effect sensors that sense the relative displacement of a magnet, strain gauges or any sensor for sensing the force on the seat. According to one embodiment of the invention, the occupant classification system 100 possesses at least three force sensors 60.

Figure 2B:
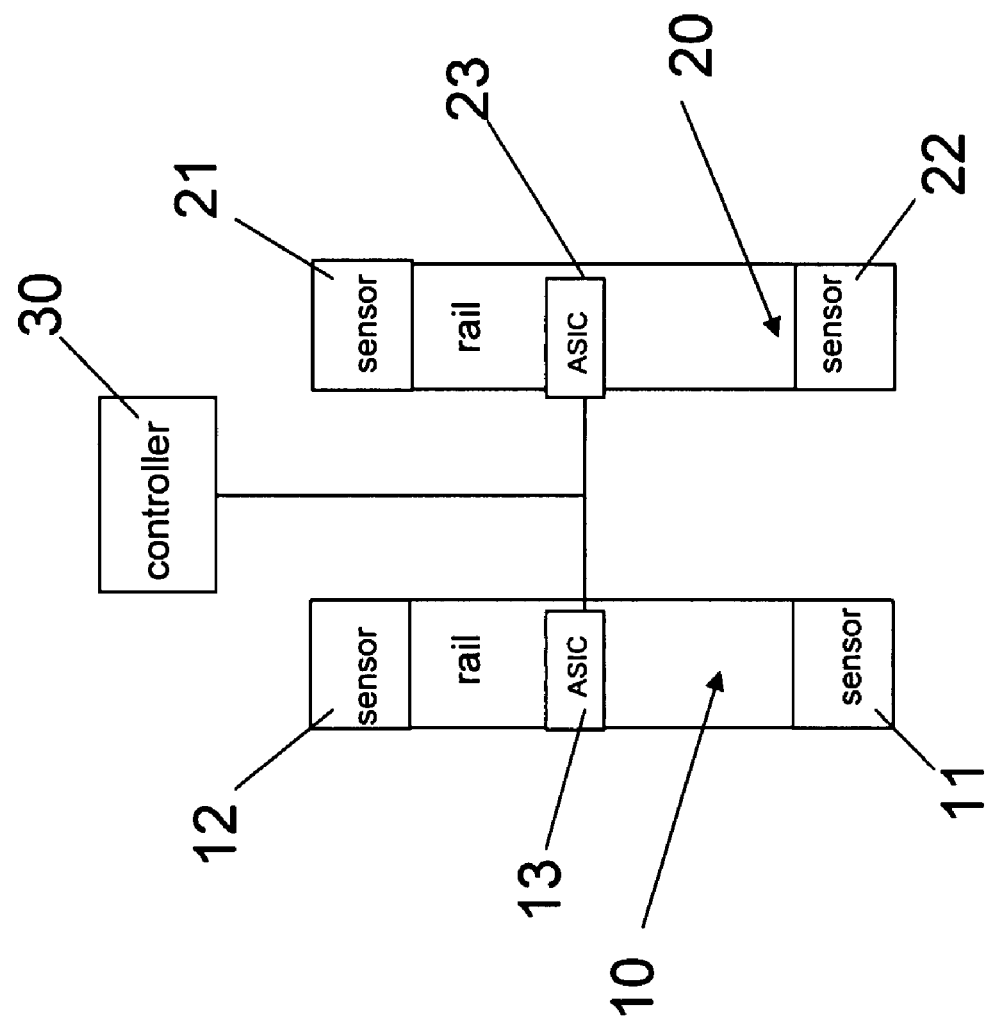
FIG. 2B is a top view of an occupation classification system according to one embodiment of the invention.

As shown in FIG. 2B, according to an embodiment of the invention, an occupant detection and classification system may include four force sensors 60. FIG. 2A shows two front force sensors 12, 21 and two rear force sensors 11, 22. The front and rear force sensors detect vertical force applied to the front and rear of the seat 1 respectively. It should be noted that the position of the front and rear force sensors is not limited to the corners of rails 10 and 20 as shown. In addition, the front and rear force sensors may be positioned along each of the rails 10 and 20.

FIG. 2B is a block drawing of a configuration for a car seat 1 according to one embodiment of the present invention. According to the embodiment, the inboard rear force sensor 11 may be positioned on the rail, near the inside of the vehicle and toward the rear of the car seat 1. The inboard front force sensor 12 may be positioned on the rail, near the inside of the vehicle and toward the front of the seat 1. The outboard rear force sensor 22 may be positioned on the rail near the outside of the vehicle toward the rear of the seat 1. The outboard front force sensor 21 may be positioned on the rail near the outside of the vehicle and toward the front of the vehicle seat 1.

As shown in FIG. 2B, the force sensors may be operably connected to one of at least two application specific integrated circuit (ASIC) 13, 23 located on each rail 10, 20. The ASICs 13, 23 transmit the vertical force measurements captured by each sensor to an electronic control unit (ECU) or controller 30. The ECU 30 is configured to calculate the occupant classification method. In addition, the ECU 30 may be configured to control the vehicle's safety restraint systems, including for example, the vehicles's airbags.

Figure 3B:
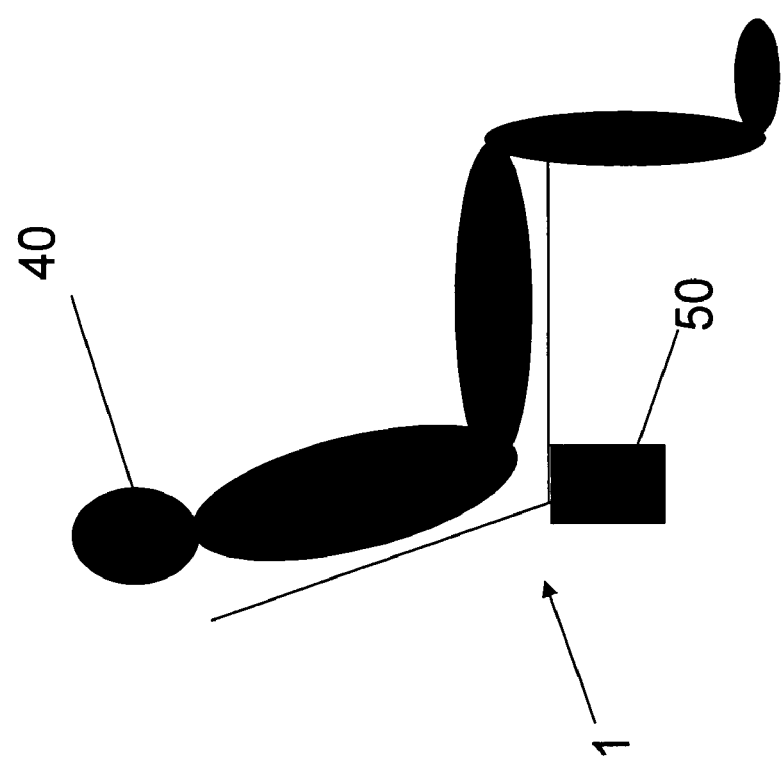
FIGS. 3A and 3B are side views of an occupant seated in a seat according to one embodiment of the invention.
Figure 3A:
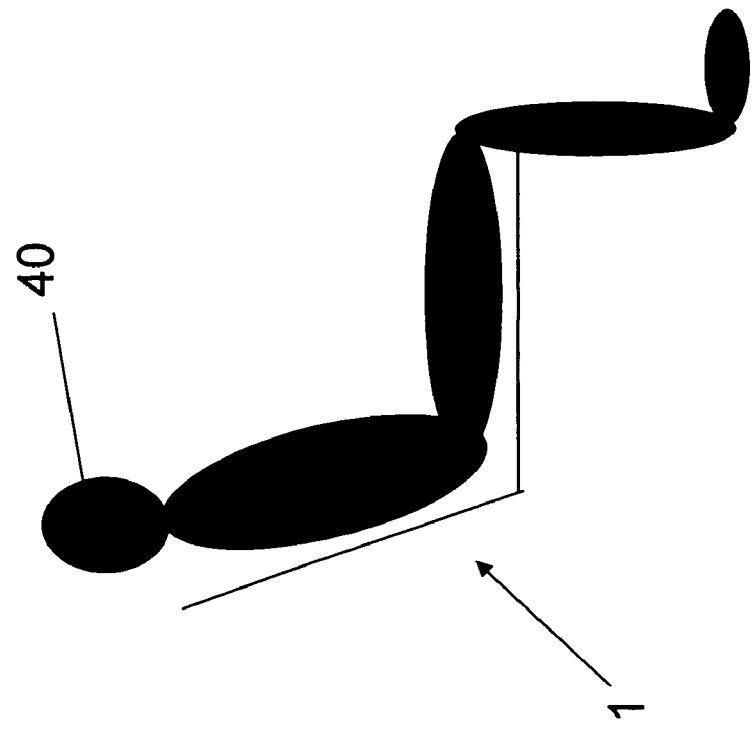

FIG. 3A is a perspective view of an occupant 40 sitting in a car seat 1. Generally, when an occupant 40 is in a natural sitting position as shown, the force measurements detected by the rear force sensors 11, 22 are greater than the force measurements detected by the front force sensors 12, 21. It follows that during operation of the vehicle, higher fluctuations in force values will be registered by the rear sensors than in the front sensors.

FIG. 3B is a perspective view of an occupant 40 sitting in a car seat 1 where an object 50 is positioned under the car seat 1. In this case, the force measurements detected by the rear force sensors 11, 22 will be less than the force measurements in the non-obstruction case of FIG. 3A. In the situation shown in FIG. 3B, the rear force sensors 11, 22 will register high force fluctuation during operation of the vehicle as compared to the front force sensors. The higher force fluctuations could occur even though the force measurements detected by the rear force sensors 11, 22 could be less than the force measurements detected by the front force sensors. Higher fluctuations caused by lower measured forces is an indication of an interference. Thus, based on these characteristics, the occupant detection system 100 is able to identify instances where an object 50 may be located under a car seat 1.

The occupant detection system 100 and method may be configured to meet various restraint deployment criteria such as detecting and controlling deployment of safety restraint systems for the following exemplary classifications: empty seat, rear facing infant seat, 3 year old, 6 year old, 5 percent female, and/or the 50 percent male. The control of the restraint system (including the various embodiments described herein) may be facilitated through use of the ECU 30. According to one embodiment of the invention, the ECU 30 is configured to perform the functions further explained below.

According to one embodiment of the invention, the ECU may be configured to identify a situation where the forces detected by the force sensors do not correspond to the weight of the occupant. For example, the ECU may be configured to monitor various measures associated with the signals provided by the sensors and to correspondingly determine whether the signals indicate that the distribution and/or fluctuation in the forces on the seat indicate that the signals cannot be used to reliably calculate the occupant classification. For example, when the difference in the magnitude of the signals received between two of the sensors exceeds a threshold value the ECU may flag a fault so that the calculation of the occupant classification can be adjusted or interrupted. In alternative embodiments, other measures of the signals received from the force sensors may be used to determine whether there is an usual force distribution. Each measure may have a predetermined threshold value. When a threshold value is exceeded a predetermined number of times a fault may be flagged. As mentioned above, the flagging of a fault may cause the occupant classification calculation to be adjusted or interrupted. The ECU may be configured to temporarily interrupt the occupant classification calculation so that when the force distribution measure returns to an appropriate level (i.e., no longer exceeds the threshold value) the occupant classification calculation can resume.

The system of the present invention is capable of detecting several different types of force measurements associated with the vehicle seat 1. First, the occupant detection system 100 can detect the total force present on a vehicle seat 1. During normal operation of the system, the total vertical force on all the sensors is indicative of the weight of the seat and the weight f the occupant. Second, the occupant detection system is capable of detecting the minimum amount of force being applied to one of a plurality of vertical force sensors 60. This measurement correlates to the minimum amount of force being applied at a single point where the vertical force sensor 60 is present.

Third, the occupant detection system 100 is capable of detecting the total force present toward the rear of the seat 1 by capturing and processing data captured by vertical force sensors 60 configured to monitor the rear of the vehicle seat 1. Fourth, the occupant detection system 100 is capable of determining the ratio of the force on a portion of the vehicle seat 1 to the total force on the vehicle seat 1. Another measurement captured by the occupant detection system 100 is the standard deviation per sensor 60. Further, the system is configured such that the controller 30 can detect fluctuations in the signals of each of a plurality of sensors 60 and determine whether a center of the fluctuations matches an expected center of gravity. For instance, one of the sensors can be assumed to be faulty or be interfered if the fluctuations in the signal received from that sensor are substantially less than the fluctuations in the signals received from the remainder of the sensors. As mentioned above, certain measures (e.g., magnitude, slope, etc.) of the signal from the sensor may be used to compare the sensors. In general, if force fluctuations or deviation are present at some sensors 60 and not in others then the ECU can be configured to assume that there is an object stuck under the non-deviating or fluctuating sensor(s) 60. The ECU or controller 30 may be configured to transmit a faulty system signal if a measure of a fluctuation in the force signal provided by any one of the force sensors is a predetermined amount less than a measure of a fluctuation from the remainder of the sensors. The faulty system signal may cause the illumination of a light or similar indicator on the vehicle instrument panel or other location visible to an occupant of the vehicle.

In one embodiment of the invention, the ECU may be configured to rely upon the average detected force values at each sensor as determined over a period of time. The system may also be configured to include the current occupant classification. For example the occupant may be classified as one of the following: empty seat, child, small adult, medium adult and a large adult.

In addition, according to one embodiment of the present invention, the system may be configured to ensure that during sharp long turns or long periods of deceleration a fault is not flagged.

Figure 4:
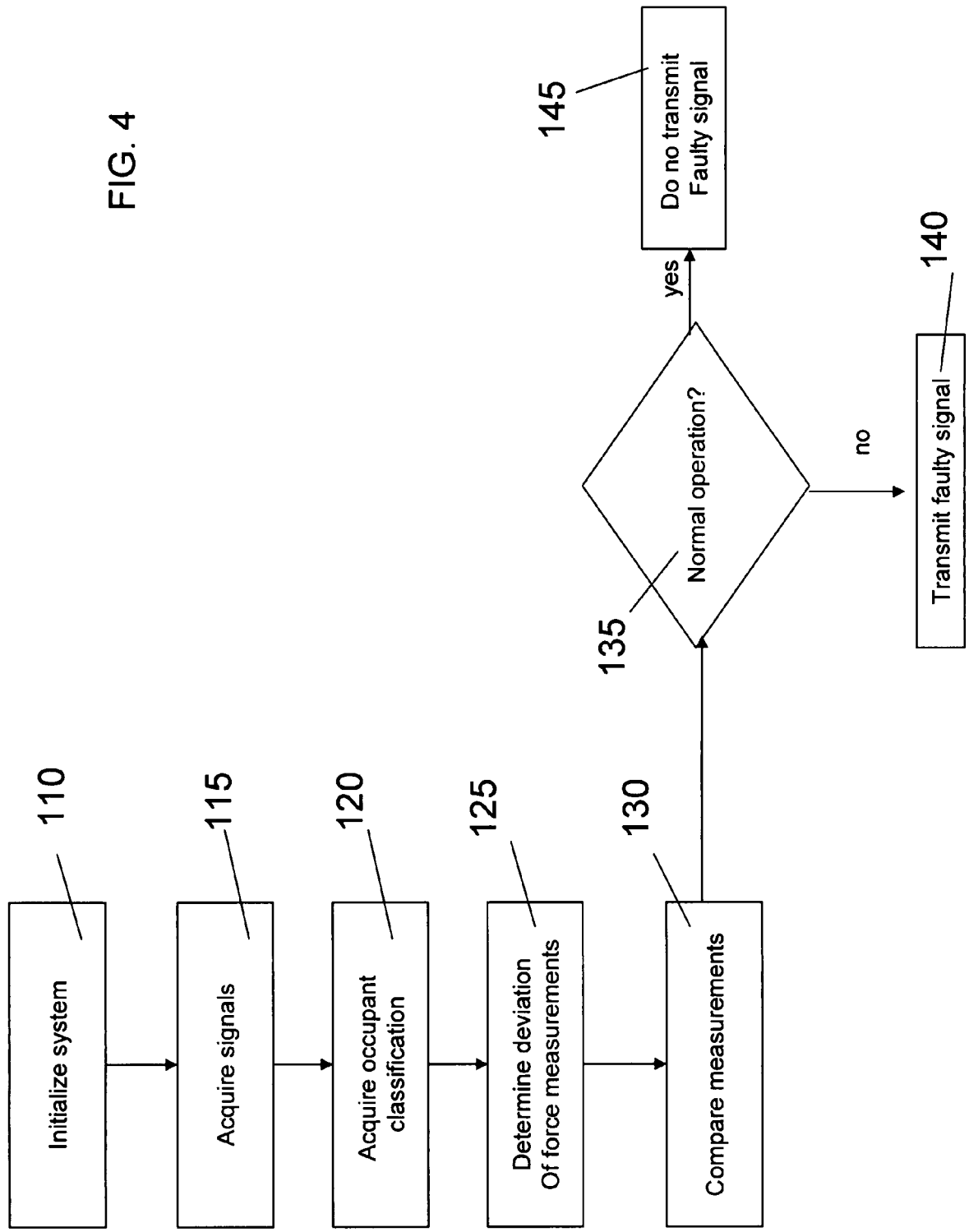
FIG. 4 is a flowchart illustrating a method for classifying an occupant according to one embodiment of the invention.

FIG. 4 is an exemplary flowchart describing the operation of the occupant classification system 100. First, the system 100 is initialized, including all sensors 60 configured to report measurements to the controller 30. (Step 110) Next, in step 115, the signals corresponding to force measurements captured by each sensor are acquired and reported to the controller 30. Then, an occupant classification may be acquired. (Step 120) As shown in Step 125, according to another embodiment of the invention, the deviation of the force measurements per sensor 60 is determined by the controller 30 based on information received from the sensors 60.

Next, the force measurements detected by the sensors 60 (e.g. the total force of the vehicle seat 1, deviation in force measurement) are compared to a plurality of threshold values. (Step 130) The controller 30 uses the threshold values to determine whether the occupant classification system 100 is operating normally. (Step 135) For example, based on the comparison, the controller can determine whether the vertical forces being applied to a force sensor 60 is not indicative of the total force of a seat 1 and an occupant positioned on the seat 1. Abnormalities in the comparisons may indicate, for example, that a significant portion of the vertical forces being applied to the force sensors 60 are being shunted by objects positioned beneath the vehicle seat 1 or abnormally placed on the top of the vehicle seat 1. According to another embodiment of the invention, the system comprises an additional sensor for sensing a vehicle characteristic, wherein the controller 30 is configured to determine the direction of external forces being applied to the vehicle seat 1 based on input from the force sensors and the additional sensor. For example, the additional sensor may detect vehicle speed, vehicle seat position, vehicle acceleration (horizontal or vertical), or seat belt tension. Finally, based on the comparison of the force measurements 60 and a plurality of threshold values, the controller transmits a faulty system signal if any of the captured force measurements is consistently below a threshold value. (Step 140) According to another embodiment of the invention, the controller 30 is configured to transmit a faulty system signal once the number of occurrences indicating a threshold value has been exceeded or not exceeded is greater than a fault maturity limit. In the alternative, no faulty signal is transmitted. (Step 145).

A faulty system signal indicates to the occupant detection system 100 that an external object or force is being applied to the seat 1. Further, the signal indicates that the nature of this external force is interfering with the normal operation of the sensors 60. Because normal operation of the sensors is affected, the occupant classification may be incorrect. Therefore, based on this information the occupant detection system 100 may configure the vehicles safety restraint systems accordingly.

In another embodiment of the invention, the system is configured to compensate for a faulty sensor or sensors or for a sensor or sensors that are being interfered with. For example, the controller may be configured to calculate the total force on the seat in a manner that ignores the input from the faulty or interfered with sensor.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A system for classifying an occupant located on a vehicle seat comprising:
    a plurality of force sensors located beneath the vehicle seat;
    a controller, wherein each of the force sensors provides a signal corresponding to the vertical force at each sensor wherein the total vertical force on all the sensors is indicative of the weight of the seat and the occupant of the seat; and
    wherein the controller is configured to provide an occupant classification calculation based on the total vertical force on the sensors and to determine whether a measure of the total vertical force on the seat is less than a threshold value, and to transmit a signal indicating a potential error in the occupant classification calculation if the measure is consistently below the threshold value.

2. The system of claim 1, wherein the controller is configured to identify when the instances are caused by a significant portion of the vertical force on the seat being shunted around one of the sensors by an object positioned beneath the vehicle seat.

3. The system of claim 1, wherein the controller is configured to identify when the instances are caused by the vertical force on the seat being increased or decreased by a force other than the weight of the seat or the weight of the occupant.

4. The system of claim 1, wherein the controller is configured to determine whether the total force on the vehicle seat is less than a threshold value.

5. The system of claim 1, wherein each of the plurality of force sensors is positioned between the vehicle seat and a seat rail.

6. The system of claim 1, wherein the plurality of force sensors includes at least three sensors positioned under the vehicle seat.

7. The system of claim 1, wherein the plurality of force sensors include a front sensor and a rear sensor, and wherein each sensor provides a force signal to the controller in a channel.

8. The system of claim 1, wherein the controller is configured to transmit a faulty system signal in an instance when the vertical forces on the force sensors are not indicative of the weight of the seat and the weight of the occupant located on the vehicle seat.

9. The system of claim 1, wherein the controller is configured to determine whether an interfering object is influencing the total vertical force determination.

10. The system of claim 1, further comprising an additional sensor for sensing a vehicle characteristic and wherein the controller is configured to determine the direction of external forces being applied on the vehicle seat based on input from the force sensors and the additional sensor.

11. The system of claim 10, wherein the additional sensor senses one of vehicle speed, vehicle seat position, vehicle acceleration or seat belt tension.

12. The system of claim 1, wherein the controller is configured to detect fluctuations in the vertical force on the sensors and determine whether a center of gravity of the fluctuations matches an expected center of gravity corresponding to the occupant classification calculated by the controller.

13. The system of claim 1, wherein the controller is configured to detect fluctuations in the signals from each of the plurality of force sensors and determine whether an unexpected low level of fluctuations from a single sensor is caused by an interfering object positioned under the seat.

14. A system for classifying an occupant located on a vehicle seat comprising:
   a plurality of force sensors located beneath the vehicle seat;
   a controller, wherein each of the force sensors provides a signal corresponding to the vertical force at each sensor wherein the total vertical force on all the sensors is indicative of the weight of the seat and the occupant of the seat; and
   wherein the controller is configured to provide an occupant classification calculation based on the total vertical force on the sensors and to transmit a faulty system signal if the distribution of the vertical force on the seat as determined from the signals provided by the sensors falls outside of a range of force distribution expected for the calculated occupant class.

15. The system of claim 14, wherein the controller is configured to compensate for a faulty sensor in the occupant classification calculation.

16. A method for detecting and classifying an occupant located in a vehicle seat comprising:
   providing a occupant classification calculation;
   providing a plurality of force sensors, each force sensor providing a signal corresponding to the vertical force on that force sensor;
   determining the total vertical force on the sensors;
   determining whether the total vertical force is less than a threshold value; and
   transmitting a signal indicating a potential error in the occupant classification calculation if the total vertical force on the seat is consistently below the threshold value.

* * * * *